(12) United States Patent
Ishihara

(10) Patent No.: US 7,903,520 B2
(45) Date of Patent: Mar. 8, 2011

(54) OPTICAL DISC RECORDING APPARATUS

(75) Inventor: Yuji Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 379 days.

(21) Appl. No.: 12/078,917

(22) Filed: Apr. 8, 2008

(65) Prior Publication Data
US 2008/0253245 A1    Oct. 16, 2008

(30) Foreign Application Priority Data
Apr. 10, 2007    (JP) .............................. 2007-102376

(51) Int. Cl.
*G11B 7/0045* (2006.01)
(52) U.S. Cl. .................................... 369/59.11; 369/116
(58) Field of Classification Search ........................ None
See application file for complete search history.

(56) References Cited

U.S. PATENT DOCUMENTS

| | | | |
|---|---|---|---|
| 6,414,922 B1 | 7/2002 | Akiyama et al. | |
| 2003/0174620 A1* | 9/2003 | Seo et al. ................. | 369/59.11 |
| 2005/0169140 A1 | 8/2005 | Adachi et al. | |
| 2006/0013118 A1* | 1/2006 | Ishida et al. ............. | 369/275.3 |
| 2006/0280089 A1 | 12/2006 | Perez et al. | |

FOREIGN PATENT DOCUMENTS

| | | |
|---|---|---|
| EP | 1 635 338 A1 | 3/2006 |
| JP | 2005-339672 | 12/2005 |

* cited by examiner

*Primary Examiner*—Thang V Tran
*Assistant Examiner*—Brian Butcher
(74) *Attorney, Agent, or Firm*—Morgan, Lewis & Bockius LLP

(57) ABSTRACT

An optical disc recorder that records information on an optical disc by means of a laser diode that forms pits in the optical disc through the application of a write pulse of a previously set type, the recorder having a reference power setter that sets a reference power that is the reference value of a drive power of the write pulse, a pulse type checker that checks whether the type of write pulse set consists of a plurality of pulses, which allows the drive power to be set for each pulse of a plurality of pulses, a power corrector for correcting the drive power of at least one pulse of the write pulse by adding a previously set correction power to the reference power, and a drive controller that applies the write pulse, which consists of the pulse with the reference power and the at least one pulse with the drive power corrected.

6 Claims, 8 Drawing Sheets

OPTICAL DISC RECORDING APPARATUS

This application is based on Japanese Patent Application No. 2007-102376 filed on Apr. 10, 2007, the contents of which are hereby incorporated by reference.

BACKGROUND OF THE INVENTION

1. Field of the Invention

The present invention relates to optical disc recording apparatuses that record information on an optical disc by means of an LD (laser diode) that forms pits in the optical disc through the application of a write pulse of a previously set type. More particularly, the present invention relates to a DVD recorder that records information on a CD (Compact Disc) or DVD (Digital Versatile Disc).

2. Description of Related Art

With the recent development of digital technology, optical disc recording apparatuses that adopt an optical disc such as a CD (Compact Disc) and a DVD (Digital Versatile Disc) as a recording medium for recording information such as music, video, and software have been increasingly widespread. In this optical disc recording apparatus, information is recorded in the form of pits formed by laser light emitted from a light source such as an LD (laser diode) and shone onto a recording layer of an optical disc on which tracks are formed in a concentric pattern, and information is reproduced based on the light reflected from the recording layer.

Power and the shape of pulse applied to the LD that forms pits greatly influence the recording quality (the shape of the formed pits). It is for this reason that various methods and apparatuses for forming pits of good quality have been proposed. For example, an optical disc apparatus that first preheats a recording layer to a temperature of less than the pit formation start temperature by irradiating it with laser light with a preheating pulse representing power that is greater than the reproducing power but equal to or smaller than 80% of the recording power, and then heats the recording layer to or above the pit formation start temperature by irradiating it with laser light with a main pulse representing the recording power has been disclosed (JP-A-2005-339672).

However, in the conventional optical disc recording apparatuses including the abovementioned optical disc apparatus, the rise in temperature of the LD leads to a decrease in the amount of emitted laser light (hereinafter, such a decrease will be referred to as "droop"). This may cause degradation of pit quality.

SUMMARY OF THE INVENTION

In view of the problems described above, an object of the present invention is to provide optical disc recording apparatuses that can form pits of good quality.

To achieve the above object, according to one aspect of the present invention, an optical disc recording apparatus is provided with: a pulse type setting portion for setting a type of write pulse to be applied to an LD (laser diode) that forms pits in an optical disc; a reference power setting portion for setting a reference power that is a reference value of a drive power of the write pulse; a pulse type checking portion for checking whether or not the type of write pulse set by the pulse type setting portion is a write pulse consisting of a plurality of pulses, the write pulse being of a type that allows the drive power to be set for each pulse of the plurality of pulses; a power correcting portion for correcting, if the pulse type checking portion judges that the write pulse is of a type that allows the drive power to be set for each of the plurality of pulses, the drive power of at least one pulse of the plurality of pulses constituting the write pulse by adding a previously set correction power to the reference power set by the reference power setting portion; and a drive control portion for applying, to the LD, the write pulse consisting of the pulse with the reference power set by the reference power setting portion and the at least one pulse with the drive power corrected by the power correcting portion. Here, information is recorded on the optical disc by means of the LD.

In the optical disc recording apparatus according to the invention, the type of write pulse is set, and the reference power that is a reference value of the drive power of a write pulse is set. Checking is then performed to check whether or not the set type of write pulse is a write pulse consisting of a plurality of pulses, the write pulse being of a type that allows the drive power to be set for each of the plurality of pulses. If the set type of write pulse is found to be a write pulse consisting of a plurality of pulses, the drive power of at least one pulse of the plurality of pulses constituting the write pulse is corrected by adding the previously set correction power to the set reference power. In addition, a write pulse consisting of a pulse with the set reference power and a pulse with the corrected drive power is applied to the LD. This makes it possible to obtain pits of good quality.

That is, the drive power of at least one pulse of a plurality of pulses constituting a write pulse is corrected by adding the previously set correction power to the set reference power, and the write pulse containing the pulse with the corrected drive power is applied to the LD. This makes it possible to prevent degradation of pit quality from occurring due to droop caused by the rise in temperature of the LD. This helps obtain pits of good quality.

To achieve the above object, in the optical disc recording apparatus according to the invention, the power correcting portion may correct the drive power of the last pulse of the plurality of pulses constituting the write pulse. This makes it possible to obtain pits of better quality.

That is, since the drive power of the last pulse of a plurality of pulses constituting a write pulse is corrected, it is possible to effectively prevent degradation of pit quality from occurring due to droop caused by the rise in temperature of the LD. This helps obtain pits of better quality.

In other words, since the longer the light is emitted, the more pronounced droop caused by the rise in temperature of the LD becomes, it is possible to effectively prevent droop from occurring by correcting the drive power of the last pulse of a plurality of pulses constituting a write pulse.

To achieve the above object, the optical disc recording apparatus according to the invention may be provided with a correction power storing portion for storing the correction power that is the amount of correction of the drive power of the write pulse, the correction power being associated with the reference power. Here, the power correcting portion may correct the drive power by reading the correction power associated with the reference power set by the reference power setting portion from the correction power storing portion, and adding the correction power thus read to the reference power. The correction power that is the amount of correction of the drive power, the correction power being associated with the reference power, is stored in the correction power storing portion, and the power correcting portion corrects the drive power by reading the correction power associated with the set reference power from the correction power storing portion, and adding the correction power thus read to the reference power. This makes it possible to obtain pits of better quality.

That is, since the greater the reference power, the more pronounced droop caused by the rise in temperature of the LD becomes, the drive power is corrected by reading the correction power associated with the set reference power from the correction power storing portion, and adding the correction power thus read to the reference power. This makes it possible to obtain pits of better quality.

To achieve the above object, in the optical disc recording apparatus according to the invention, the correction power storing portion may store the correction power associated with the type of write pulse, and the power correcting portion may correct the drive power by reading the correction power associated with the type of write pulse set by the pulse type setting portion from the correction power storing portion, and adding the correction power thus read to the reference power. The correction power associated with the type of write pulse is stored in the correction power storing portion, and the drive power is corrected by reading the correction power associated with the set type of write pulse from the correction power storing portion, and adding the correction power thus read to the reference power. This makes it possible to obtain pits of better quality.

That is, since the influence of droop caused by the rise in temperature of the LD varies depending on the type of write pulse, the drive power is corrected by reading the correction power associated with the set type of write pulse from the correction power storing portion, and adding the correction power thus read to the reference power. This makes it possible to obtain pits of better quality.

DETAILED DESCRIPTION OF PREFERRED EMBODIMENTS

Figure 1:
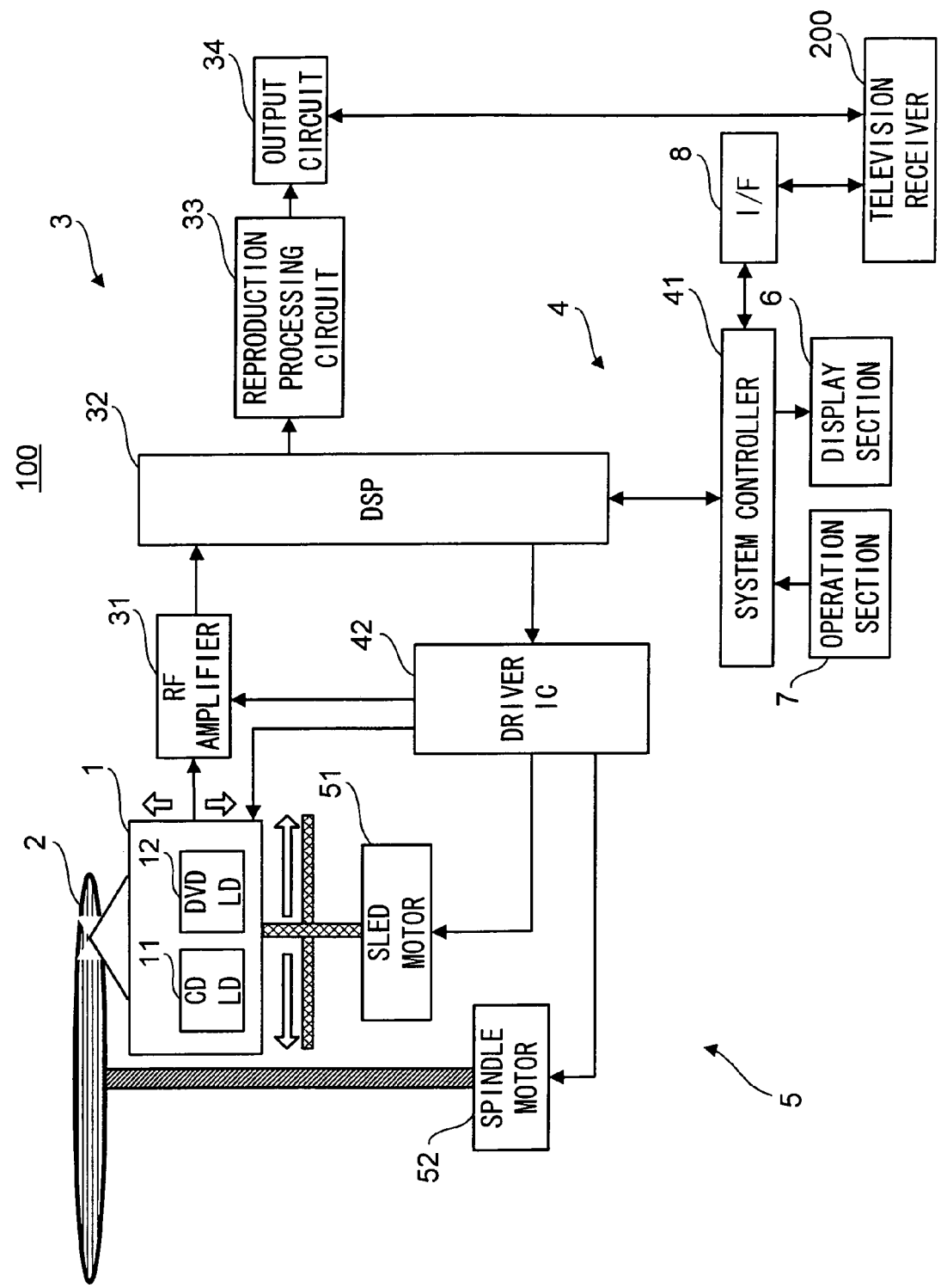
FIG. 1 is a configuration diagram showing an example of a DVD recorder according to the invention.

Hereinafter, an embodiment of the present invention will be described with reference to the accompanying drawings. FIG. 1 is a configuration diagram showing an example of a DVD recorder according to the invention. A DVD recorder 100 (corresponding to an optical disc recording apparatus) includes an optical pickup 1, an output device 3, a control device 4, a drive device 5, a display section 6, and an operation section 7.

The DVD recorder 100 can communicate with a television receiver 200. The television receiver 200 includes an unillustrated loudspeaker and an unillustrated monitor. The television receiver 200 receives television broadcast, and outputs the received video information to the DVD recorder 100. In addition, the television receiver 200 outputs information such as audio information and video information from the DVD recorder 100 via the loudspeaker and the monitor.

The optical pickup 1 includes an LD (laser diode) 11 for CDs (hereinafter an "LD 11") and an LD 12 for DVDs (hereinafter an "LD 12"), and converts the light reflected from an optical disc 2 (CD or DVD) to be played back into an electrical signal. The optical pickup 1 reads out various information, such as audio information and video information, stored in the optical disc 2 (CD or DVD), and writes various information, such as audio information and video information, to the optical disc 2 (CD or DVD). The LD 11 emits laser light for reading out information stored in the CD and writing information to the CD. The LD 12 emits laser light for reading out information stored in the DVD and writing information to the DVD. The optical pickup 1 is configured so as to be movable by a sled motor 51 in the direction of the radius of the optical disc 2 and in the vertical direction toward and away from the optical disc 2.

Here the optical disc 2 mounted on the DVD recorder 100 is a DVD-R (recordable), a DVD+R, or a DVD-RW (rewritable). In the optical disc 2, pits are formed with write pulses for different marks (3T to 14T), which will be described later with reference to FIG. 4.

The output device 3 converts the information, such as audio information and video information, from the optical pickup 1 into audio and images, and outputs them to the unillustrated loudspeaker and monitor, respectively, provided in the television receiver 200. In addition, the output device 3 converts the information, such as audio information and video information, from the television receiver 200, and outputs it to the optical pickup 1. The output device 3 includes an RF amplifier 31, a DSP (digital signal processor) 32, a reproduction processing circuit 33, and an output circuit 34. The RF amplifier 31 amplifies a signal corresponding to the information, such as audio information and video information, from the optical pickup 1.

The DSP 32 and the reproduction processing circuit 33 perform various kinds of information processing (such as image processing) for reproducing the signal from the RF amplifier 31. The output circuit 34 performs processing such as DA conversion for outputting the information from the reproduction processing circuit 33 to the unillustrated loudspeaker and monitor provided in the television receiver 200. The DSP 32 converts the information from the television receiver 200.

The control device 4 controls the operation of the optical pickup 1 and the drive device 5 based on an operation instruction received via the operation section 7, and includes a system controller 41 and a driver IC 42. The system controller 41 receives the information from the operation section 7 and then transmits it to the DSP 32. In addition, the system controller 41 transmits the information from the DSP 32 to the display section 6.

The driver IC 42 (corresponding to a part of a drive control portion) controls the operation of the optical pickup 1 and the drive device 5 based on an instruction from the DSP 32. Specifically, the driver IC 42 controls the power to be supplied to the LD 11 and the LD 12 provided in the optical pickup 1, and controls the operation of the sled motor 51 and the spindle motor 52 constituting the drive device 5.

Figure 2:
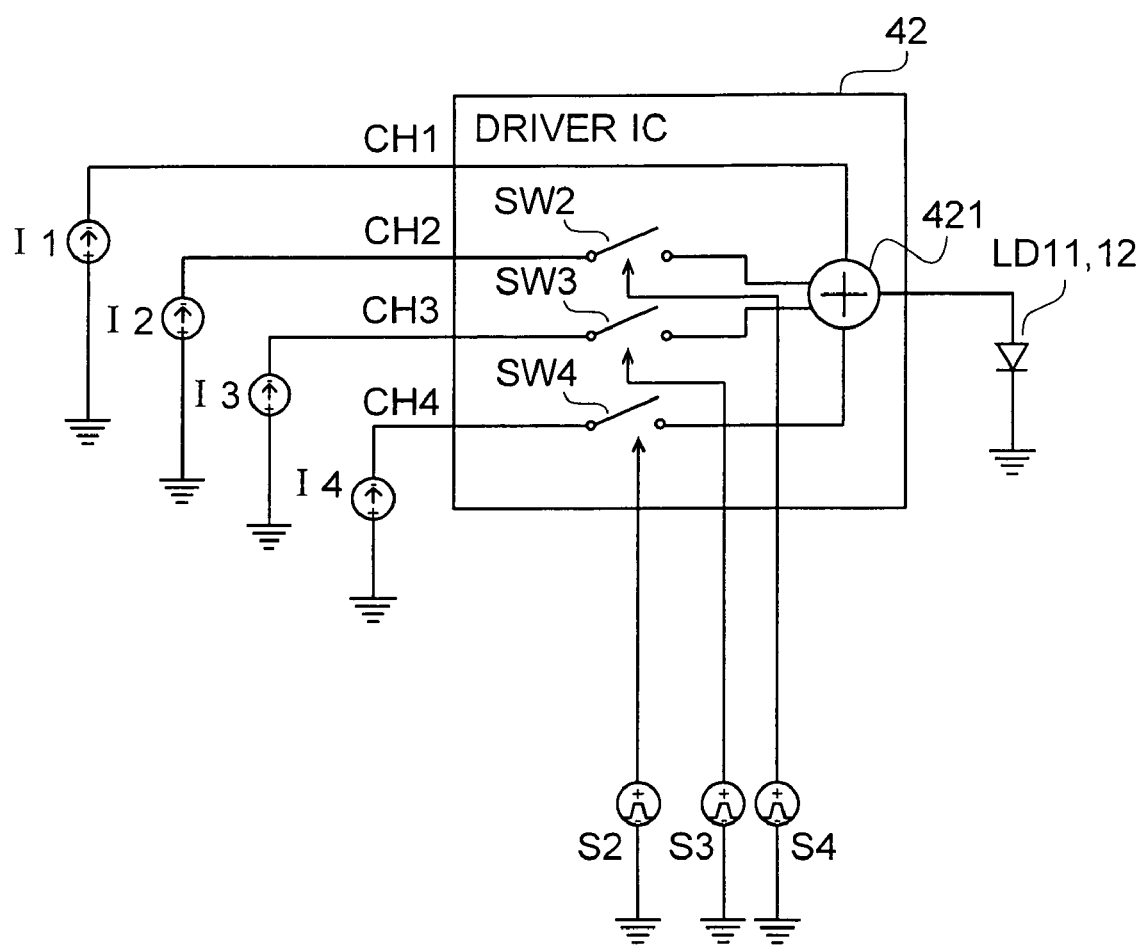
FIG. 2 is a circuit diagram showing an example of the equivalent circuit of the driver IC.

FIG. 2 is a circuit diagram showing an example of the equivalent circuit of the driver IC 42. The driver IC 42 includes three switches SW2 to SW4 and an adder 421. The adder 421 adds up the power supplied from direct-current power supplies I1 to I4, and supplies the drive power to the LD (LD 11 or LD 12). The adder 421 receives electricity from the direct-current power supply I1, and from the direct-current power supplies I2 to I4 via the switches SW2 to SW4.

The ON/OFF of the three switches SW2 to SW4 is controlled by control signals S2 to S4 outputted from the DSP 32 (a drive control section 326, which will be described later). That is, by controlling the ON/OFF of the three switches SW2 to SW4 by the control signals S2 to S4 outputted from the DSP 32, it is possible to control the drive power to be supplied to the LD (LD 11 or LD 12) from the adder 421. In this embodiment, it is possible to control the drive power in four levels: the direct-current power supply I1, the direct-current power supply I1 plus the direct-current power supply I2, the direct-current power supply I1 plus the direct-current power supply I2 plus the direct-current power supply I3, and the direct-current power supply I1 plus the direct-current power supply I2 plus the direct-current power supply I3 plus the direct-current power supply I4.

Back in FIG. 1, the description of the configuration of the DVD recorder 100 will be continued. The drive device 5 includes the sled motor 51 and the spindle motor 52. Based on an instruction from the driver IC 42, the sled motor 51 moves the optical pickup 1 in the direction of the radius of the optical disc 2 and in the vertical direction. The spindle motor 52 rotates the optical disc 2 based on an instruction from the driver IC 42.

The display section 6 includes an LCD (liquid crystal display) or the like, and displays the information from the DSP 32 so that it can be viewed from the outside. The operation section 7 is provided with different operation buttons and the like. The operation section 7 receives an operation from the user, and outputs a corresponding operation signal to the DSP 32.

Figure 3:
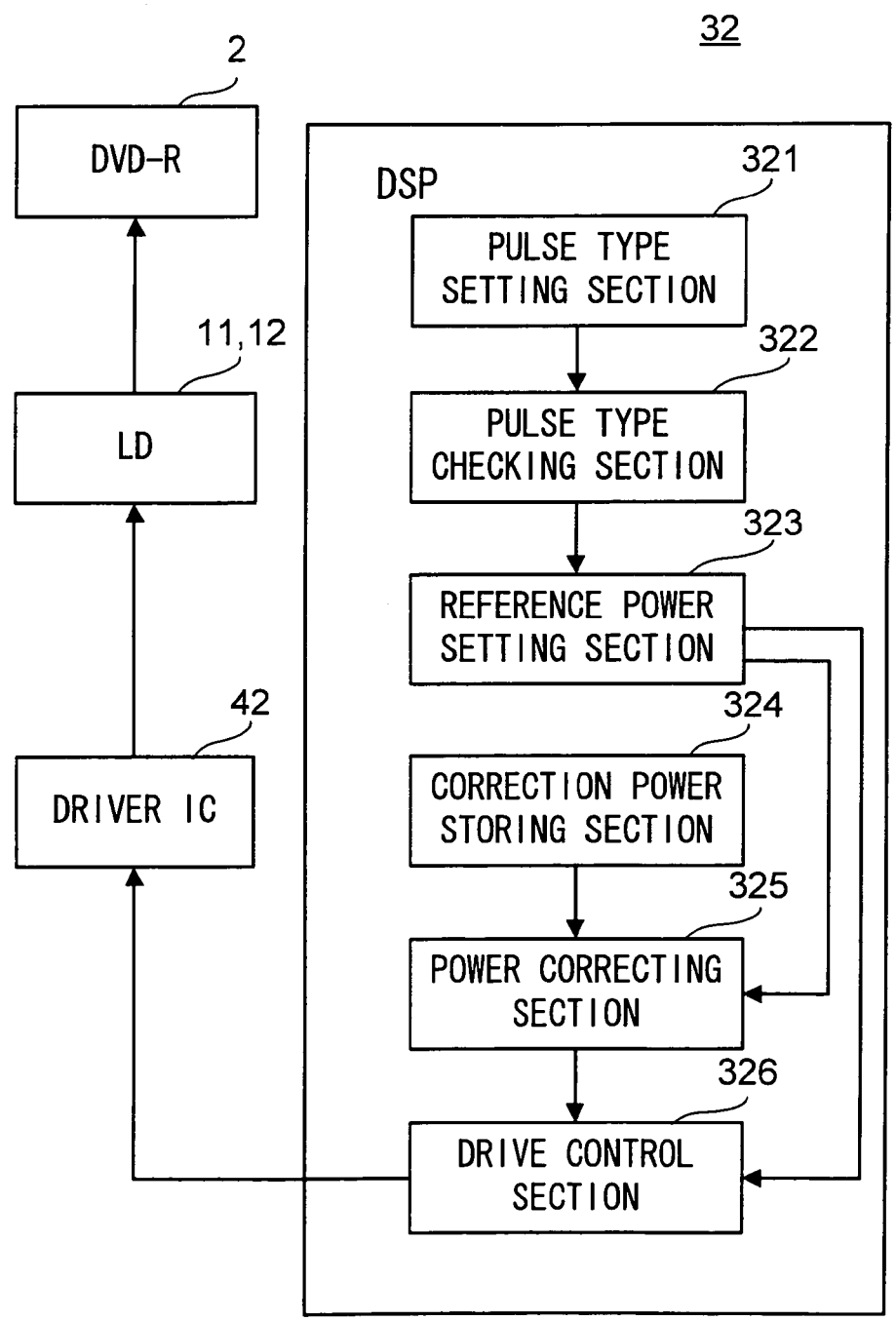
FIG. 3 is a configuration diagram showing an example of the functional configuration of a principal portion of the DVD recorder (DSP)

FIG. 3 is a configuration diagram showing an example of the functional configuration of a principal portion of the DVD recorder 100 (DSP 32). The DSP 32 functionally includes a pulse type setting section 321, a pulse type checking section 322, a reference power setting section 323, a correction power storing section 324, a power correcting section 325, and a drive control section 326.

Here, the DSP 32 reads and executes a program previously stored in an unillustrated ROM (read only memory) or the like, thereby functioning as a functional section such as the pulse type setting section 321, the pulse type checking section 322, the reference power setting section 323, the correction power storing section 324, the power correcting section 325, and the drive control section 326.

Of various kinds of data stored in an unillustrated RAM (random access memory) or ROM, data that can be stored in a detachable recording medium may be read by a drive such as a hard disk drive, an optical disc drive, a flexible disk drive, a silicon disk drive, or a cassette media reader. In this case, used as the recording medium are, for example, a hard disk, an optical disc, a flexible disk, a CD, a DVD, and a semiconductor memory.

Figure 4A:
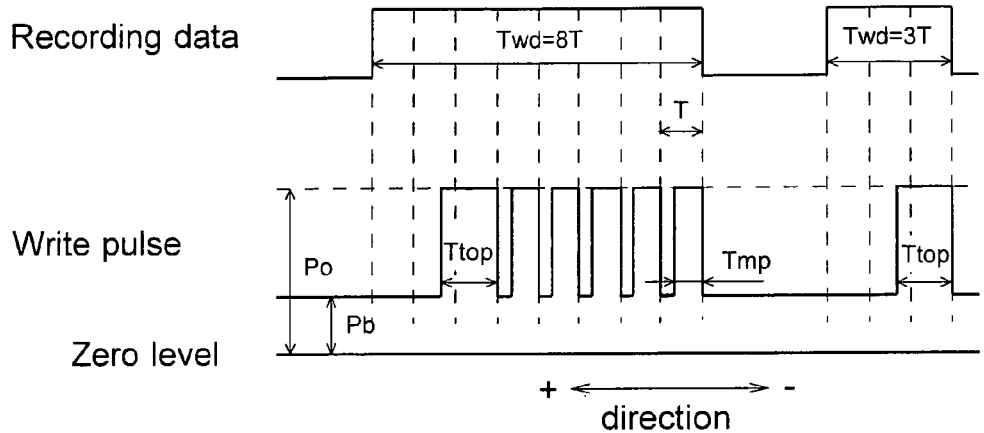
FIGS. 4A to 4C are timing charts each illustrating an example of the type of write pulse set by the pulse type setting section.
Figure 4B:
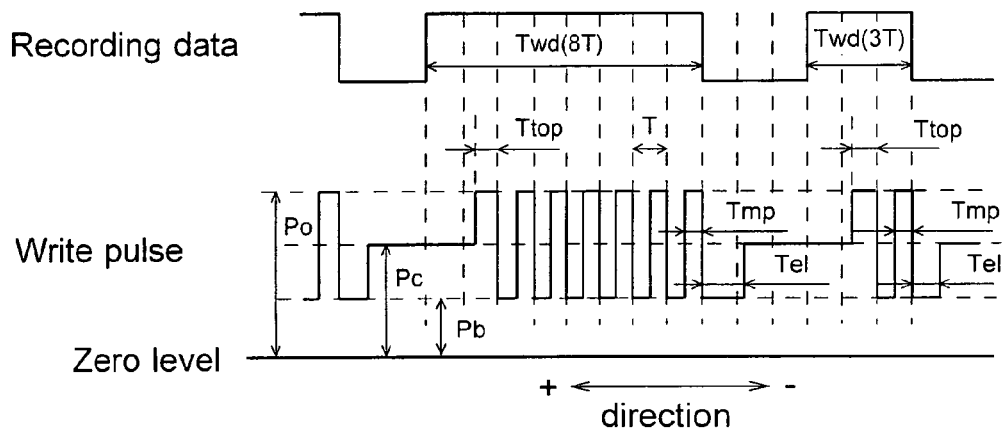
Figure 4C:
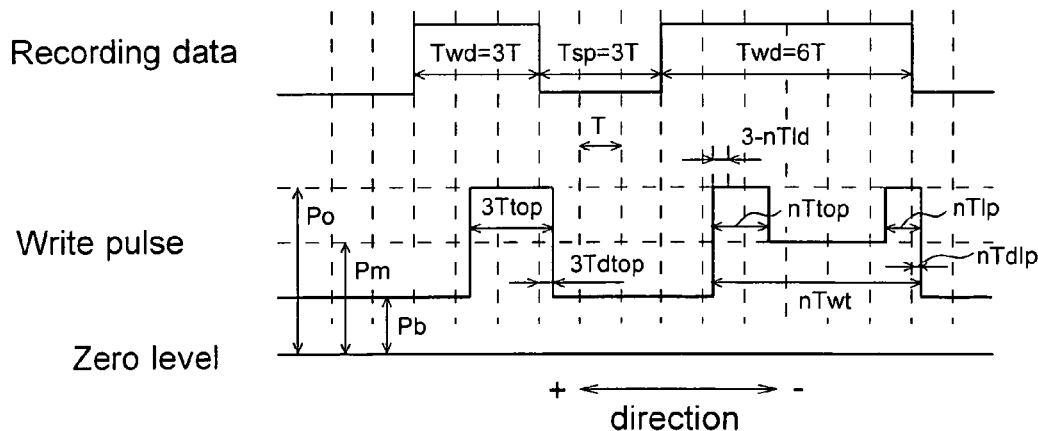

The pulse type setting section 321 (corresponding to a pulse type setting portion) sets the type of write pulse based on the type and the recording speed of the optical disc 2 mounted on the DVD recorder 100. FIGS. 4A to 4C are timing charts each illustrating an example of the type of write pulse set by the pulse type setting section 321. FIG. 4A shows a write pulse of a multipulse type, which is used when recording to a DVD-R is performed at single speed (or double speed), FIG. 4B shows a write pulse used when recording to a DVD-RW is performed, and FIG. 4C shows a write pulse of a non-multipulse type, which is used when recording to a DVD-R is performed at quadruple speed. FIGS. 4A to 4C each show, from top to bottom, an example of a timing chart of recording data and a write pulse.

In FIG. 4A, recording data and a write pulse for mark "8T" are shown on the left, and recording data and a write pulse for make "3T" are shown on the right. As shown in FIG. 4A, the recording data for mark "8T" and the recording data for mark "3T" have a pulse width "8T" and a pulse width "3T" ("T" is a unit width time defined in standards), respectively. The write pulse for mark "8T" consists of a leading pulse having a pulse width Ttop and five following pulses each having a pulse width Tmp. The write pulse for mark "3T" consists of a leading pulse having a pulse width Ttop. The level of the leading pulse and the following pulse is set to a value of a reference power P0.

That is, in this case, a write pulse for mark "nT" (wherein n=3, 4, . . . , 14) consists of one leading pulse and (n-3) following pulse. Therefore, in a write pulse for mark "nT" (wherein n=3, 4, . . . , 14), the power applied to the (n-3)th following pulse (i.e., the last pulse) is corrected by the power correcting section 325, which will be described later. It is to be noted that the present invention cannot be applied to the write pulse for mark "3T", because it consists of one pulse (a leading pulse).

In FIG. 4B, recording data and a write pulse for mark "8T" are shown on the left, and recording data and a write pulse for mark "3T" are shown on the right. As shown in FIG. 4B, the recording data for mark "8T" and the recording data for mark "3T" have a pulse width "8T" and a pulse width "3T" ("T" is a unit width time defined in standards), respectively. The write pulse for mark "8T" consists of a leading pulse having a pulse width Ttop and six following pulses each having a pulse width Tmp. The write pulse for mark "3T" consists of a leading pulse having a pulse width Ttop and one following pulse having a pulse width Tmp. The level of the leading pulse and the following pulse is set to a value of the reference power P0. Incidentally, a preheating pulse representing a previously set power Pc (>0) that is smaller than the reference power P0 is added to the leading pulse.

That is, in this case, a write pulse for mark "nT" (wherein n=3, 4, . . . , 14) consists of one leading pulse and (n-2) following pulse. Therefore, in a write pulse for mark "nT" (wherein n=3, 4, . . . , 14), the power applied to the (n-2)th following pulse (i.e., the last pulse) is corrected by the power correcting section 325, which will be described later.

In FIG. 4C, recording data and a write pulse for mark "3T" are shown on the left, and recording data and a write pulse for mark "6T" are shown on the right. As shown in FIG. 4C, the recording data for mark "3T" and the recording data for mark "6T" have a pulse width "3T" and a pulse width "6T" ("T" is a unit width time defined in standards), respectively. The write pulse for mark "3T" consists of a leading pulse having a pulse width 3Ttop. The write pulse for mark "6T" consists of a leading pulse having a pulse width nTtop and one following pulse having a pulse width nTlp (in this case, n=6). Incidentally, the power between the leading pulse and the following pulse is set to a previously set power Pm (>0) that is smaller than the reference power P0.

That is, in this case, a write pulse for mark "nT" (wherein n=3, 4, . . . , 14) consists of one leading pulse and one following pulse. Therefore, in a write pulse for mark "nT" (wherein n=3, 4, . . . , 14), the power applied to the following pulse is corrected by the power correcting section 325, which will be described later. It is to be noted that the present invention cannot be applied to the write pulse for mark "3T", because it consists of one pulse (a leading pulse).

Figure 5A:
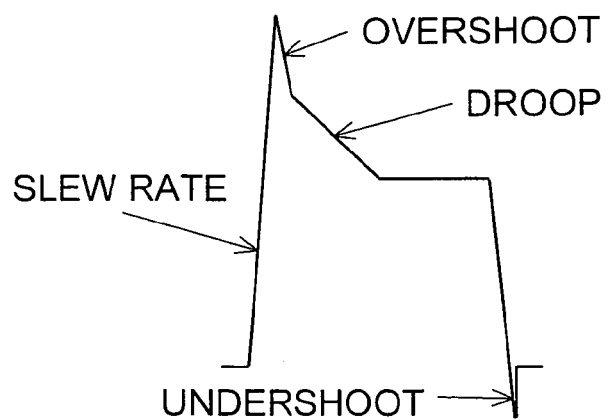
FIGS. 5A to 5E are waveform diagrams showing droop in a write pulse and its influence on the recording data.
Figure 5B:
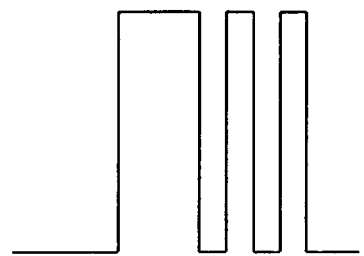
Figure 5C:
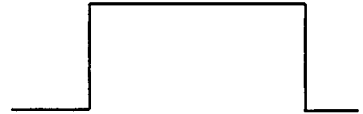
Figure 5D:
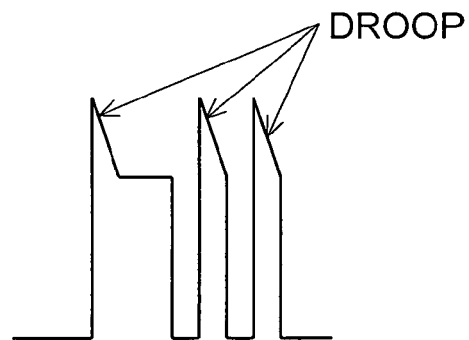
Figure 5E:
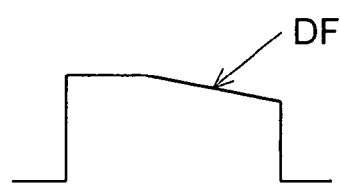

FIGS. 5A to 5E are waveform diagrams showing droop in a write pulse and its influence on the recording data. FIG. 5A is a diagram for explaining the terms associated with waveform quality. FIG. 5B is a diagram showing an ideal waveform of a write pulse for mark "5T" of a multipulse type shown in FIG. 4A, and FIG. 5C is a diagram showing the recording data (corresponding to pits) of FIG. 5B. FIG. 5D is a diagram showing an actually obtained waveform corresponding to FIG. 5B, and FIG. 5E is a diagram showing the recording data (corresponding to pits) of FIG. 5C.

As shown in FIG. 5A, a write pulse is not a perfect rectangular pulse, and slew rate, overshoot, droop, undershoot, and the like, occur in the write pulse. For example, droop, which is compensated for by the present invention, is a decrease in the amount of light emitted from an LD with a rise in temperature of the LD. As shown in FIGS. 5B and 5C, a write pulse having a perfect rectangular shape achieves ideal recording data (corresponding to pits). However, as shown in FIGS. 5D and 5E, if droop occurs, the recording data (corresponding to pits) suffers degradation (corresponding to a shallow portion of pits) DF.

Back in FIG. 3, the description of the functional configuration of the DSP 32 will be continued. The pulse type checking section 322 (corresponding to a pulse type checking portion) checks whether or not the type of write pulse set by the pulse type setting section 321 is a write pulse consisting of a plurality of pulses, the write pulse being of a type that allows the drive power to be set for each of the plurality of pulses.

For example, in a case where a write pulse of the type shown in FIG. 4A is set, the pulse type checking section 322 judges that a write pulse for mark "3T" does not consist of a plurality of pulses, and judges that a write pulse for any other mark (mark "nT", wherein n=4 to 14) consists of a plurality of pulses. On the other hand, for example, in a case where a write pulse of the type shown in FIG. 4B is set, the pulse type checking section 322 judges that a write pulse for any mark (mark "nT", wherein n=3 to 14) consists of a plurality of pulses. Furthermore, for example, in a case where a write pulse of the type shown in FIG. 4C is set, the pulse type checking section 322 judges that a write pulse for mark "3T" does not consist of a plurality of pulses, and judges that a write pulse for any other mark (mark "nT", wherein n=4 to 14) consists of a plurality of pulses.

The reference power setting section 323 (corresponding to a reference power setting portion) sets the reference power P0 that is a reference value of the drive power of a write pulse.

The correction power storing section 324 (corresponding to a correction power storing portion) previously stores a correction power α that is the amount of correction of the drive power, the correction power α being associated with the reference power P0 and the type of write pulse. In a case where the reference power P0 is smaller than 30 mW, for example, the correction power α stored in the correction power storing section 324 is zero (that is, no correction is performed by the power correcting section 325).

Figure 6:
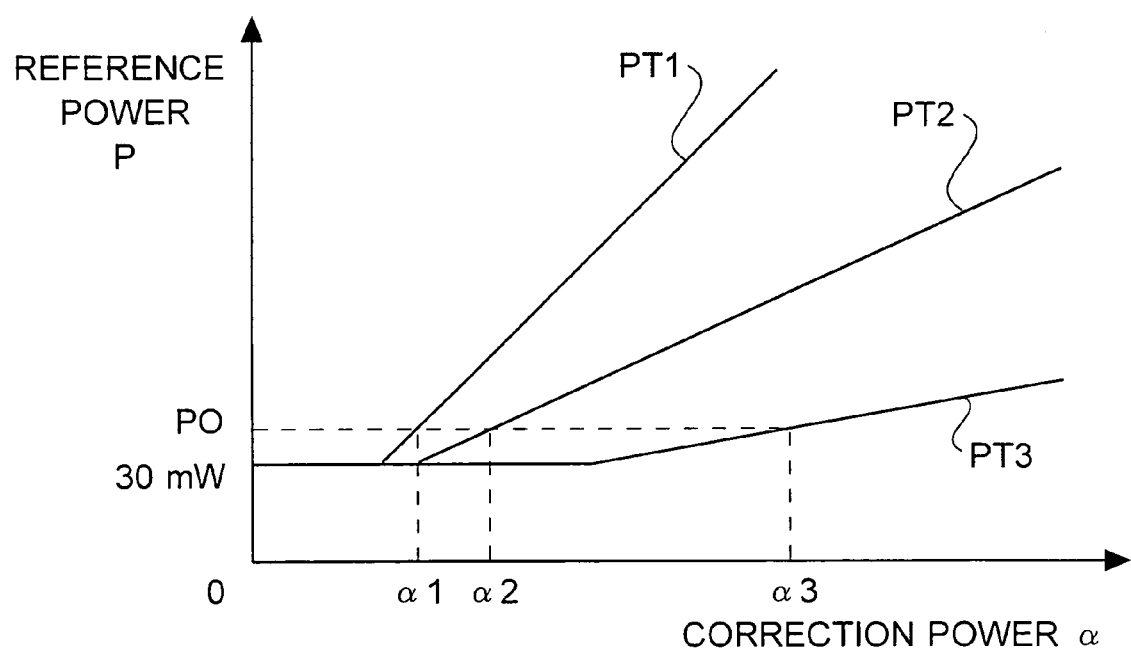
FIG. 6 is a graph showing an example of correction power α stored in the correction power storing section.

FIG. 6 is a graph showing an example of the correction power α stored in the correction power storing section 324. The vertical axis of the graph represents the recording power P, and the horizontal axis represents the correction power α. Graphs PT1 to PT3 correspond to different types of write pulse. For example, suppose that the reference power P0 is set by the reference power setting section 323. Then, if the type of write pulse corresponding to graph PT1 is applied, the power correcting section 325 sets a correction power α1. If the type of write pulse corresponding to graph PT2 is applied, the power correcting section 325 sets a correction power α2. If the type of write pulse corresponding to graph PT3 is applied, the power correcting section 325 sets a correction power α3.

If the pulse type checking section 322 judges that a write pulse consists of a plurality of pulses, the power correcting section 325 (corresponding to a power correcting portion) corrects the drive power of at least one pulse of the plurality of pulses constituting the write pulse by adding the previously set correction power α to the reference power P0 set by the reference power setting section 323.

Specifically, the power correcting section 325 corrects the drive power of the last pulse of a plurality of pulses constituting a write pulse. In addition, the power correcting section 325 corrects the drive power by reading the correction power α associated with the type of write pulse set by the pulse type setting section 321 from the correction power storing section 324, and adding the correction power α thus read to the reference power P0 set by the reference power setting section 323.

The drive control section 326 (corresponding to a part of a drive control portion) applies, to the LD (LD 11 or LD 12), a write pulse consisting of a pulse with the drive power set by the reference power setting section 323 and a pulse with the drive power (P0+α) corrected by the power correcting section 325.

Figure 7:
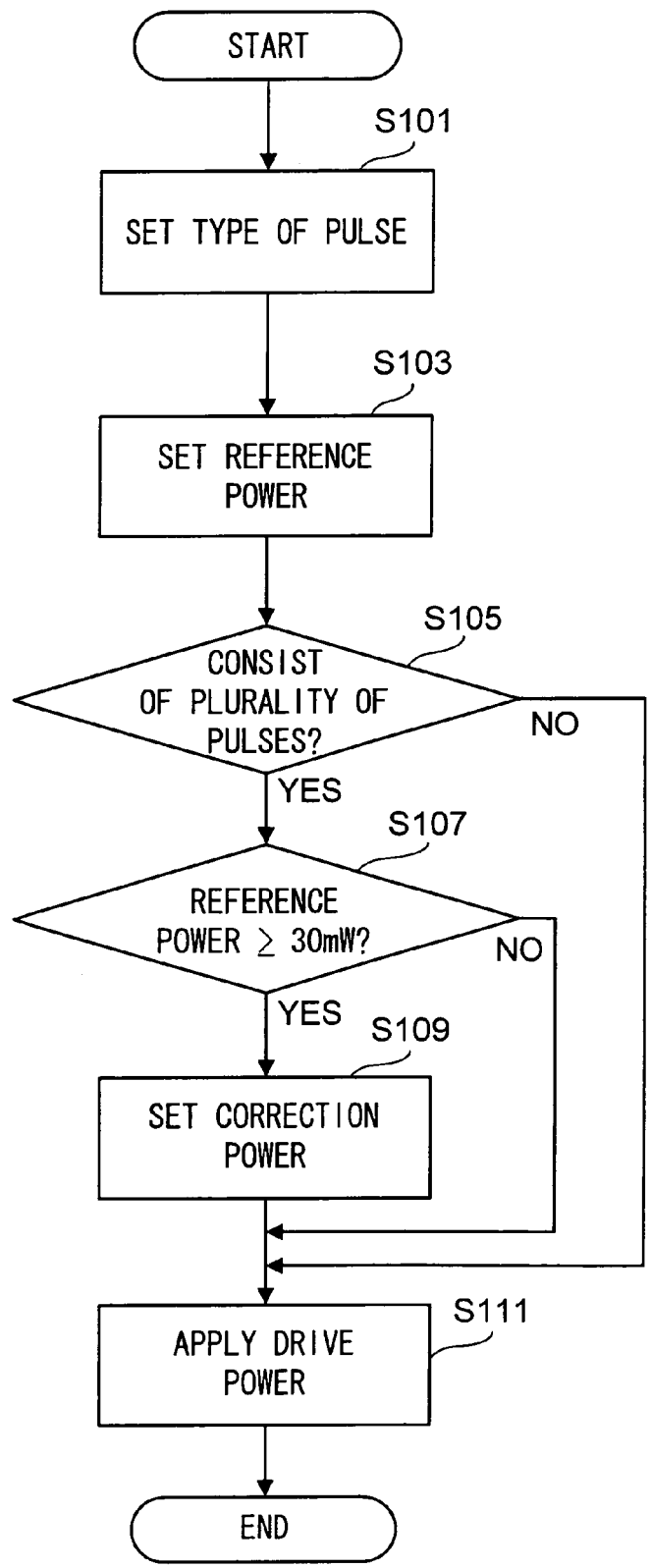
FIG. 7 is a flow chart showing an example of the operation of the DVD recorder (mainly the DSP) according to the invention.

FIG. 7 is a flow chart showing an example of the operation of the DVD recorder 100 (mainly the DSP 32) according to the invention. First, the pulse type setting section 321 sets the type of write pulse (S101). Then, the reference power setting section 323 sets the reference power P0 (S103). Next, the pulse type checking section 322 checks whether or not the type of write pulse set in step S101 is a write pulse consisting of a plurality of pulses (S105).

If the type of write pulse is found not to be a write pulse consisting of a plurality of pulses (NO in S105), the procedure goes to step S111. If the type of write pulse is found to be a write pulse consisting of a plurality of pulses (YES in S105), the correction power storing section 324 checks whether or not the reference power P0 set in step S103 is equal to or greater than 30 mW (S107). If the reference power P0 is found to be smaller than 30 mW (NO in S107), the procedure goes to step S111. If the reference power P0 is found to be equal to or greater than 30 m W (YES in S107), the power correcting section 325 obtains the correction power α, and corrects the drive power of the last pulse of the plurality of pulses constituting the write pulse by adding the correction power α thus obtained to the reference power P0 (S109). If processing in step S109 is completed, NO in step S105, or NO in step S107, the set drive power is applied to the LD (LD 11 or LD 12) (S111). This is the end of the procedure.

Figure 8A:
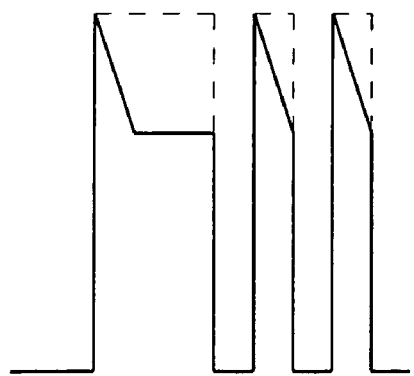
FIGS. 8A to 8D are waveform diagrams showing an example of the effects of the invention.
Figure 8B:
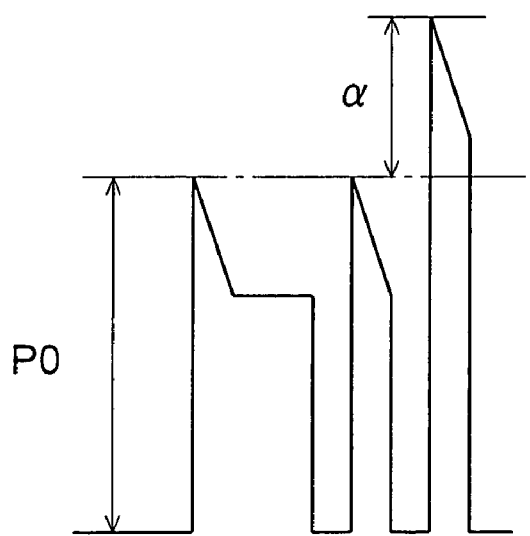
Figure 8C:
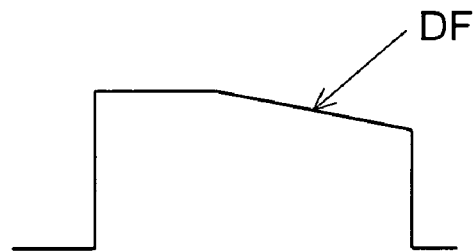
Figure 8D:
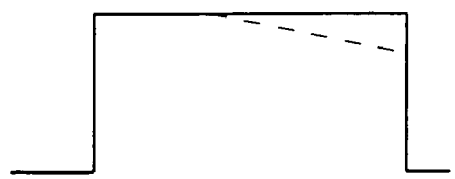

FIGS. 8A to 8D are waveform diagrams showing an example of the effects of the invention. FIG. 8A is a diagram (which is identical to that shown in FIG. 5D) showing an actually obtained waveform (corresponding to a waveform to which the invention is yet to be applied) of a write pulse of a multipulse type shown in FIG. 4A, the write pulse for mark "5T", and FIG. 8C is a diagram (which is identical to that shown in FIG. 5E) showing the recording data (corresponding to pits) of FIG. 8A. FIG. 8B is a diagram showing a waveform corresponding to FIG. 8A, the waveform observed when the invention is applied, and FIG. 8D is a diagram showing the recording data (corresponding to pits) of FIG. 8B.

As shown in FIG. 8B, correction is performed in such way that the power of the last (second) following pulse of the write pulse for mark "5T" is increased by the correction power α. As a result, as shown in FIG. 8D, the recording data (corresponding to pits) of good quality is obtained.

As described above, the type of write pulse is set, and the reference power P0 that is a reference value of the drive power of a write pulse is set. Checking is then performed to check whether or not the type of write pulse thus set is a write pulse consisting of a plurality of pulses, the write pulse being of a type that allows the drive power to be set for each of the plurality of pulses. If the set type of write pulse is found to be a write pulse consisting of a plurality of pulses, the drive power of at least one pulse of the plurality of pulses constituting the write pulse is corrected by adding the previously set correction power α to the set reference power P0. In addition, a write pulse consisting of a pulse with the set reference power P0 and a pulse with the corrected drive power (P0+α) is applied to the LD (LD 11 or LD 12). This makes it possible to obtain pits of good quality.

That is, the drive power of at least one pulse of a plurality of pulses constituting a write pulse is corrected by adding the previously set correction power α to the set reference power P0, and the write pulse containing the pulse with the corrected drive power (P0+α) is applied to the LD (LD 11 or LD 12). This makes it possible to prevent degradation of pit quality from occurring due to droop caused by the rise in temperature of the LD (LD 11 or LD 12). This helps obtain pits of good quality.

In addition, since the drive power of the last pulse of a plurality of pulses constituting a write pulse is corrected, it is possible to obtain pits of better quality.

That is, since the drive power of the last pulse of a plurality of pulses constituting a write pulse is corrected, it is possible to effectively prevent degradation of pit quality from occurring due to droop caused by the rise in temperature of the LD. This helps obtain pits of better quality.

In other words, since the longer the light is emitted, the more pronounced droop caused by the rise in temperature of the LD (LD 11 or LD 12) becomes, it is possible to effectively prevent droop from occurring by correcting the drive power of the last pulse of a plurality of pulses constituting a write pulse (see FIGS. 8A to 8D).

Furthermore, a correction power α that is the amount of correction of the drive power, the correction power α being associated with the reference power P0, is stored in the correction power storing section 324 (see FIG. 6), and the drive power is corrected by reading the correction power α associated with the set reference power P0 from the correction power storing section 324, and adding the correction power α thus read to the reference power P0. This makes it possible to obtain pits of better quality.

That is, since the greater the reference power P0, the more pronounced droop caused by the rise in temperature of the LD (LD 11 or LD 12) becomes, the drive power is corrected by reading the correction power α associated with the set reference power P0 from the correction power storing section 324, and adding the correction power α thus read to the reference power P0. This makes it possible to obtain pits of better quality.

In addition, the correction power α associated with the type of write pulse is stored in the correction power storing section 324 (see FIG. 6), and the drive power is corrected by reading the correction power α associated with the set type of write pulse from the correction power storing section 324, and adding the correction power α thus read to the reference power P0. This makes it possible to obtain pits of better quality.

That is, since the influence of droop caused by the rise in temperature of the LD (LD 11 or LD 12) varies depending on the type of write pulse, the drive power is corrected by reading the correction power α associated with the set type of write pulse from the correction power storing section 324, and adding the correction power α thus read to the reference power P0. This makes it possible to obtain pits of better quality.

It is to be noted that the invention may be modified as follows.

(A) The embodiment described above deals with a case in which the optical disc recording apparatus is the DVD recorder 100. It is to be understood, however, that the optical disc recording apparatus may be an apparatus of any other type as long as it records information on an optical disc by means of an LD (laser diode) that forms pits in the optical disc through the application of a write pulse of a previously set type. For example, the optical disc recording apparatus may be a personal computer having the function of recording information on a DVD.

(B) The embodiment described above deals with a case in which the DSP 32 functions as a functional section such as the pulse type setting section 321, the pulse type checking section 322, the reference power setting section 323, the correction power storing section 324, the power correcting section 325, and the drive control section 326. However, it is also possible to realize at least one functional section with hardware such as circuitry.

(C) The embodiment described above deals with a case in which the optical disc 2 is a DVD-R or a DVD-RW. It is to be understood, however, that the optical disc 2 may be an optical disc of any other type. For example, the optical disc 2 may be a DVD+R or a CD.

(D) The embodiment described above deals with a case in which the power correcting section 325 corrects the drive power of the last pulse of a plurality of pulses constituting a write pulse. However, the present invention is not limited to this specific configuration, but may be otherwise as long as the power correcting section 325 corrects the drive power of at least one pulse of a plurality of pulses constituting a write pulse. For example, the power correcting section 325 may correct the drive power of all of a plurality of pulses constituting a write pulse, except a leading pulse.

What is claimed is:

1. An optical disc recording apparatus, comprising:
a pulse type setting portion for setting a type of write pulse to be applied to an LD (laser diode) that forms pits in an optical disc;
a reference power setting portion for setting a reference power that is a reference value of a drive power of the write pulse;
a pulse type checking portion for checking whether or not the type of write pulse set by the pulse type setting portion is a write pulse consisting of a plurality of pulses, the write pulse being of a type that allows the drive power to be set for each pulse of the plurality of pulses;
a power correcting portion for correcting, if the pulse type checking portion judges that the write pulse is of a type that allows the drive power to be set for each of the plurality of pulses, the drive power of at least one pulse of the plurality of pulses constituting the write pulse by adding a previously set correction power to the reference power set by the reference power setting portion; and
a drive control portion for applying, to the LD, the write pulse consisting of the pulse with the reference power set by the reference power setting portion and the at least one pulse with the drive power corrected by the power correcting portion,
wherein information is recorded on the optical disc by means of the LD.

2. The optical disc recording apparatus of claim 1,
wherein the power correcting portion corrects the drive power of a last pulse of the plurality of pulses constituting the write pulse.

3. The optical disc recording apparatus of claim 1, further comprising:
a correction power storing portion for storing the correction power that is an amount of correction of the drive power of the write pulse, the correction power being associated with the reference power,
wherein the power correcting portion corrects the drive power by reading the correction power associated with the reference power set by the reference power setting portion from the correction power storing portion, and adding the correction power thus read to the reference power.

4. The optical disc recording apparatus of claim 2, further comprising:
a correction power storing portion for storing the correction power that is an amount of correction of the drive power of the write pulse, the correction power being associated with the reference power,
wherein the power correcting portion corrects the drive power by reading the correction power associated with the reference power set by the reference power setting portion from the correction power storing portion, and adding the correction power thus read to the reference power.

5. The optical disc recording apparatus of claim 3,
wherein the correction power storing portion stores the correction power associated with the type of write pulse,
wherein the power correcting portion corrects the drive power by reading the correction power associated with the type of write pulse set by the pulse type setting portion from the correction power storing portion, and adding the correction power thus read to the reference power.

6. The optical disc recording apparatus of claim 4,
wherein the correction power storing portion stores the correction power associated with the type of write pulse,
wherein the power correcting portion corrects the drive power by reading the correction power associated with the type of write pulse set by the pulse type setting portion from the correction power storing portion, and adding the correction power thus read to the reference power.

* * * * *